(12) United States Patent
Akkarakaran et al.

(10) Patent No.: US 11,368,943 B2
(45) Date of Patent: Jun. 21, 2022

(54) UPLINK CONTROL INFORMATION CONFIGURATION FOR RANDOM ACCESS CHANNEL

(71) Applicant: QUALCOMM Incorporated, San Diego, CA (US)

(72) Inventors: Sony Akkarakaran, Poway, CA (US); Xiaoxia Zhang, San Diego, CA (US); Tao Luo, San Diego, CA (US); Yisheng Xue, San Diego, CA (US); Jing Sun, San Diego, CA (US); Ozcan Ozturk, San Diego, CA (US); Linhai He, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 161 days.

(21) Appl. No.: 16/838,820

(22) Filed: Apr. 2, 2020

(65) Prior Publication Data
US 2020/0322949 A1 Oct. 8, 2020

Related U.S. Application Data

(60) Provisional application No. 62/830,330, filed on Apr. 5, 2019.

(51) Int. Cl.
*H04W 72/04* (2009.01)
*H04W 74/08* (2009.01)

(52) U.S. Cl.
CPC ... *H04W 72/0413* (2013.01); *H04W 74/0833* (2013.01)

(58) Field of Classification Search
CPC ........... H04W 74/0833; H04W 74/004; H04W 72/0413; H04W 72/046; H04B 7/0695
See application file for complete search history.

(56) References Cited

U.S. PATENT DOCUMENTS

| | | | |
|---|---|---|---|
| 2014/0010178 A1* | 1/2014 | Yu | H04W 74/004 370/329 |
| 2017/0359114 A1* | 12/2017 | Akkarakaran | H04L 5/0048 |
| 2019/0254071 A1* | 8/2019 | Park | H04W 72/042 |
| 2020/0112355 A1* | 4/2020 | Park | H04B 7/0626 |
| 2020/0145981 A1* | 5/2020 | Harada | H04L 5/0025 |
| 2021/0258062 A1* | 8/2021 | Koskela | H04W 74/02 |

(Continued)

FOREIGN PATENT DOCUMENTS

| | | |
|---|---|---|
| WO | 2019018542 A1 | 1/2019 |
| WO | 2019032853 A1 | 2/2019 |

OTHER PUBLICATIONS

International Search Report and Written Opinion—PCT/US2020/026631—ISA/EPO—dated Jun. 23, 2020.

(Continued)

*Primary Examiner* — Brian D Nguyen
(74) *Attorney, Agent, or Firm* — Harrity & Harrity, LLP

(57) ABSTRACT

Various aspects of the present disclosure generally relate to wireless communication. In some aspects, a user equipment (UE) may initiate a random access channel (RACH) procedure using a first beam associated with a base station (BS). The UE may transmit, to the BS and during the RACH procedure, an uplink control information (UCI) communication that indexes into a resource set of beams to indicate one or more second beams associated with the BS. Numerous other aspects are provided.

30 Claims, 12 Drawing Sheets

(56) References Cited

U.S. PATENT DOCUMENTS

| | | | |
|---|---|---|---|
| 2021/0289377 A1* | 9/2021 | Seo | H04L 5/0048 |
| 2021/0314062 A1* | 10/2021 | Kakishima | H04B 7/088 |
| 2021/0320711 A1* | 10/2021 | Lee | H04B 7/024 |
| 2021/0329660 A1* | 10/2021 | Zhang | H04W 72/042 |
| 2021/0336750 A1* | 10/2021 | Zhou | H04W 24/08 |

OTHER PUBLICATIONS

International Search Report and Written Opinion—PCT/US2020/026631—ISAEPO—dated Jul. 26, 2021.

* cited by examiner

UCI Communication – Example 1

| Indication of one or more beams (as an index into a resource set) |
|---|

UCI Communication – Example 2

| Indication of one or more beams (as an index into a resource set) | Indication of measurements for the one or more beams (explicit or implicit) |
|---|---|

UCI Communication – Example 3

| Indication of one or more beams (as an index into a resource set) | Indication of measurements for the one or more beams (explicit or implicit) | Indication of preferred beam |
|---|---|---|

UCI Communication – Example 4

| Indication of one or more beams (first beam not included) | Indication of measurements for the one or more beams (explicit or implicit) | Indication of an order of the one or more beams |
|---|---|---|

UPLINK CONTROL INFORMATION CONFIGURATION FOR RANDOM ACCESS CHANNEL

CROSS-REFERENCE TO RELATED APPLICATION

This application claims priority to U.S. Provisional Patent Application No. 62/830,330, filed on Apr. 5, 2019, entitled "UPLINK CONTROL INFORMATION CONFIGURATION FOR RANDOM ACCESS CHANNEL," which is hereby expressly incorporated by reference herein.

FIELD OF THE DISCLOSURE

Aspects of the present disclosure generally relate to wireless communication, and to techniques and apparatuses for uplink control information (UCI) configuration for random access channel (RACH).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method of wireless communication, performed by a user equipment (UE), may include initiating a random access channel (RACH) procedure using a first beam associated with a base station (BS) and transmitting, to the BS and during the RACH procedure, an uplink control information (UCI) communication that indexes into a resource set of beams to indicate one or more second beams associated with the BS.

In some aspects, a UE for wireless communication may include memory and one or more processors operatively coupled to the memory. The memory and the one or more processors may be configured to initiate a RACH procedure using a first beam associated with a BS and transmit, to the BS and during the RACH procedure, a UCI communication that indexes into a resource set of beams to indicate one or more second beams associated with the BS.

In some aspects, a non-transitory computer-readable medium may store one or more instructions for wireless communication. The one or more instructions, when executed by one or more processors of a UE, may cause the one or more processors to initiate a RACH procedure using a first beam associated with a BS and transmit, to the BS and during the RACH procedure, a UCI communication that indexes into a resource set of beams to indicate one or more second beams associated with the BS.

In some aspects, an apparatus for wireless communication may include means for initiating a RACH procedure using a first beam associated with a BS and means for transmitting, to the BS and during the RACH procedure, a UCI communication that indexes into a resource set of beams to indicate one or more second beams associated with the BS.

In some aspects, a method of wireless communication, performed by a BS, may include receiving, from a UE and during a RACH procedure, a UCI communication that indicate respective indexes associated with one or more beams associated with the BS; and identifying, based at least in part on the respective indexes, the one or more beams in a resource set of beams.

In some aspects, a BS for wireless communication may include memory and one or more processors operatively coupled to the memory. The memory and the one or more processors may be configured to receive, from a UE and during a RACH procedure, a UCI communication that indicate respective indexes associated with one or more beams associated with the BS and identify, based at least in part on the respective indexes, the one or more beams in a resource set of beams.

In some aspects, a non-transitory computer-readable medium may store one or more instructions for wireless communication. The one or more instructions, when executed by one or more processors of a BS, may cause the one or more processors to receive, from a UE and during a RACH procedure, a UCI communication that indicate respective indexes associated with one or more beams associated with the BS and identify, based at least in part on the respective indexes, the one or more beams in a resource set of beams.

In some aspects, an apparatus for wireless communication may include means for receiving, from a UE and during a RACH procedure, a UCI communication that indicate respective indexes associated with one or more beams associated with the apparatus and means for identifying, based at least in part on the respective indexes, the one or more beams in a resource set of beams.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A-4F are diagrams illustrating one or more examples of uplink control information (UCI) configuration for random access channel (RACH), in accordance with various aspects of the present disclosure.

DETAILED DESCRIPTION

Figure 1:
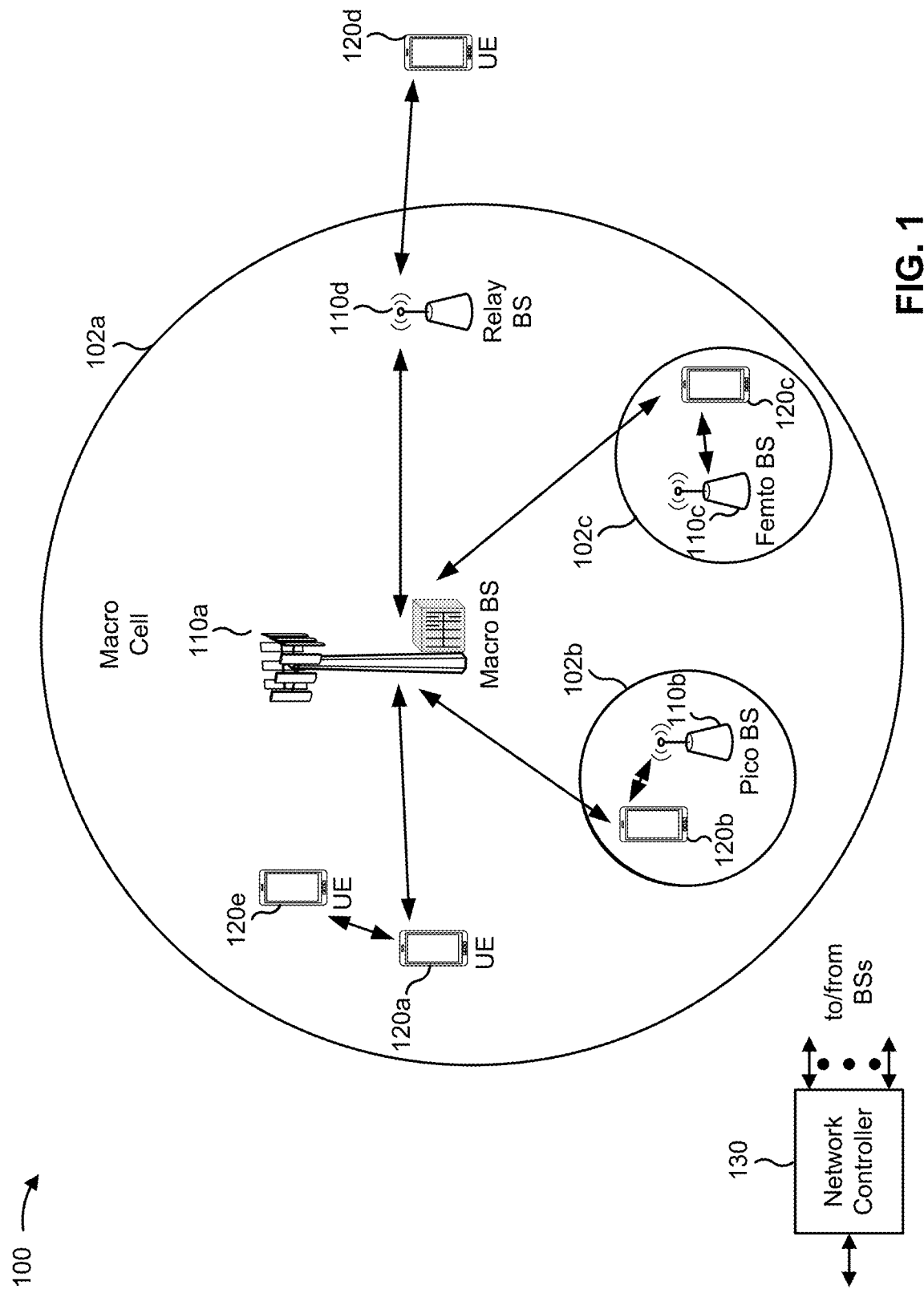
FIG. 1 is a block diagram conceptually illustrating an example of a wireless communication network, in accordance with various aspects of the present disclosure.

A user equipment (UE) may access a wireless network by negotiating a connection with a base station (BS) included in the wireless network. During connection establishment, the UE and the BS may synchronize the connection in the downlink direction (that is, from BS to UE) and in the uplink direction (that is, from UE to BS).

To synchronize the connection in the downlink direction, the UE may read a synchronization signal block (SSB) that includes various synchronization signals transmitted from the BS. The synchronization signals may include a primary synchronization signal (PSS), a secondary synchronization signal (SSS), a primary broadcast channel (PBCH), and/or the like. The UE may use the PSS to determine symbol timing in the downlink direction, and may use the SSS to determine a physical cell identifier associated with the BS, and may use the PBCH to determine the frame timing.

To synchronize the connection in the uplink direction, the UE and the BS may perform a random access channel (RACH) procedure. In some aspects, the UE and the BS may perform a four-step RACH procedure. In a four-step RACH procedure, the UE and the BS may exchange four primary RACH communications. The UE may transmit a msg1 communication to the BS. The msg1 communication may include a RACH preamble communication that is transmitted in a RACH occasion (e.g., a particular set of time-frequency resources), the combination of which may be referred to as a RACH signature. The BS may respond to the msg1 communication with a msg2 communication, which may include a random access response (RAR) communication. The UE may respond to the msg2 communication with a msg3 communication, which may include a radio resource control (RRC) connection request communication. The BS may respond to the msg3 communication with a msg4 communication, which may include a medium access control (MAC) control element (MAC-CE) contention resolution identifier, an RRCSetup command, and/or the like.

In some cases, the four-step RACH procedure may not meet the low latency requirements of 5G/NR wireless systems. Accordingly, the UE and the BS may use a two-step RACH procedure to reduce latency in synchronizing the connection in the uplink direction. In a two-step RACH procedure, the UE may combine the msg1 communication and the msg3 communication into a communication referred to as a msgA communication. The msg1 portion of the msgA communication may be referred to as the preamble portion of the msgA communication. The msg3 portion of the msgA communication may be referred to as the payload portion of the msgA. The UE may transmit the msg1 portion and the msg3 portion sequentially and prior to receiving the msg2 communication and the msg4 communication. The BS may receive the msgA communication and may transmit a msgB communication, which may include the msg2 communication and the msg4 communication.

In some aspects, the BS may transmit on a plurality of beams. In some cases, the UE may select a beam, of the plurality of beams, on which to initiate a RACH procedure based at least in part on the beam occurring early in the RACH occasion selected by the UE. The UE may continue to measure the plurality of beams, as the UE and the BS perform the RACH procedure. Moreover, the UE may determine, during the RACH procedure, that the beam on which the RACH procedure was initiated is not a preferred beam for the UE. However, the UE may be unable to indicate, to the BS and during the RACH procedure, the plurality of beams, the measurements of the plurality of beams, and/or the preferred beam. As a result, the UE may be unable to switch to the preferred beam until after the RACH procedure is complete, the BS's ability to perform channel state information reference signal (CSIRS) configuration and/or beam refinement may be delayed, and/or the like.

Some aspects, described herein, provide techniques and apparatuses for uplink control information (UCI) configuration for RACH. In some aspects, a UE may transmit a UCI communication to a BS during a RACH procedure. The UCI communication may include various types of information, such as an indication of one or more beams associated with the BS, an indication of one or more measurements (e.g., reference signal received power (RSRP) measurements) for the one or more beams, an indication of a preferred beam for the UE, and/or the like. In some aspects, the UE may configure the UCI communication such that the indication of the one or more beams indexes in to a resource set of beams. The resource set of beams may include a subset of the maximum quantity of beams (e.g., 64 beams) that may be configured for the BS, may include different types of beams (e.g., SSB-based beams, CSIRS-based beams, and/or the like), and/or the like. In this way, the UCI communication may indicate beams that are associated with different beam types in the same report (whereas different beam types conventionally are indicated in separate reports), may indicate the one or more beams by indexing into a smaller resource set of beams (e.g., relative to the maximum quantity of beams that may be configured for the BS), which reduces the quantity of bits needed to indicate the one or more beams.

Moreover, to further reduce the quantity of bits needed for the UCI communication, the UE may configure the UCI communication such that the beam, on which the RACH procedure was initiated, is not included in the indication of the one or more beams. In this case, the use of the beam for initiating the RACH procedure may function as an implicit indication of the beam. To ensure that the UCI communication is still parseable, the UE may include an indication of an order of the one or more beams in the UCI communication, which may be based at least in part on a shift of the order of the one or more beams due to the beam, on which the RACH procedure was initiated, not being included in the one or more beams indicated in the UCI communication.

In some aspects, the UE may configure the UCI communication such that the UCI communication indicates a preferred beam (and the associated measurement) of the UE. In this way, instead of the BS assuming that the beam with the greatest measurement is the preferred beam, the UE can use the UCI communication to select different beams (e.g., other than the beam with the greatest measurement) as the preferred beam (e.g., for power consumption considerations and/or the like).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used. A BS and a UE may initiate communications by performing a RACH procedure. For example, the UE may perform one or more measurements of one or more SSBs and/or one or more CSIRSs associated with one or more beams transmitted from the BS, may select a beam based at least in part on the one or more measurements, and may initiate the RACH procedure with the BS suing the selected beam.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different radio access technologies (RATs). In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
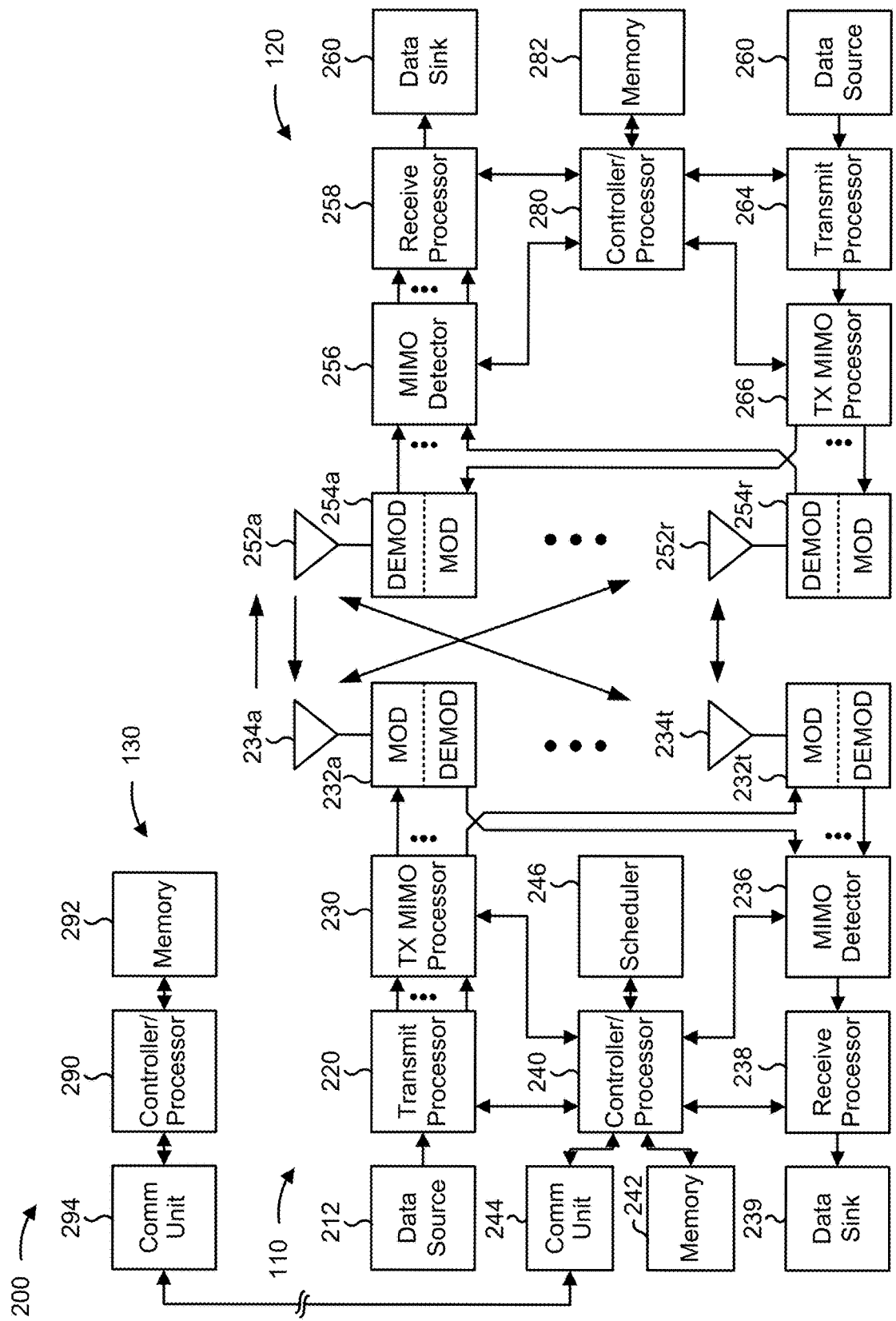
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UCI configuration for RACH, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. A scheduler 246 may schedule UEs for data transmission on the downlink and/or uplink.

Figure 5:
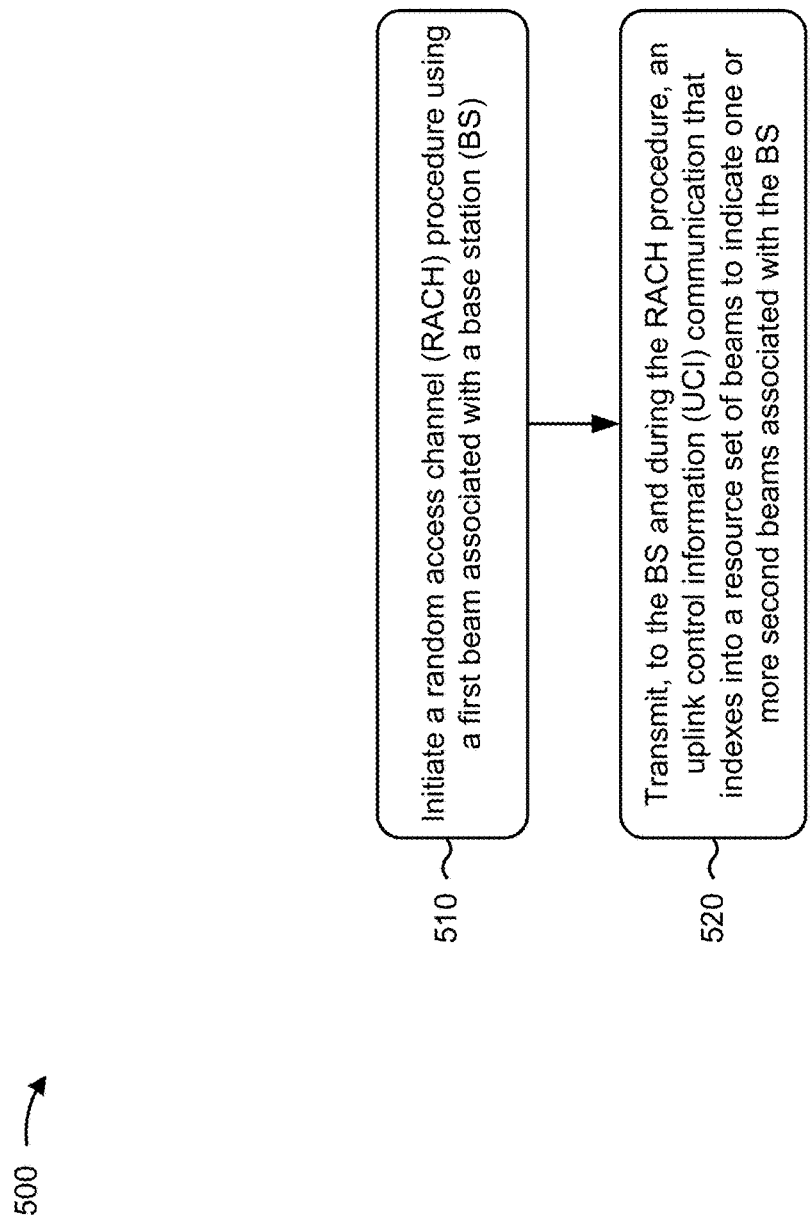
FIG. 5 is a diagram illustrating an example process performed, for example, by a UE, in accordance with various aspects of the present disclosure.

The stored program codes, when executed by processor 280 and/or other processors and modules at UE 120, may cause the UE 120 to perform operations described with respect to process 500 of FIG. 5 and/or other processes as described herein. The stored program codes, when executed by processor 240 and/or other processors and modules at base station 110, may cause the base station 110 to perform operations described with respect to process 600 of FIG. 6 and/or other processes as described herein. A scheduler 246 may schedule UEs for data transmission on the downlink and/or uplink.

In some aspects, UE 120 may include means for initiating a RACH procedure using a first beam associated with a base station 110, means for transmitting, to the BS and during the RACH procedure, a UCI communication that indexes into a resource set of beams to indicate one or more second beams associated with the BS, and/or the like. In some aspects, such means may include one or more components of UE 120 described in connection with FIG. 2.

In some aspects, base station 110 (BS) may include means for receiving, from a UE 120 and during a RACH procedure, a UCI communication that indicate respective indexes associated with one or more beams associated with the BS, means for identifying, based at least in part on the respective indexes, the one or more beams in a resource set of beams, and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3A:
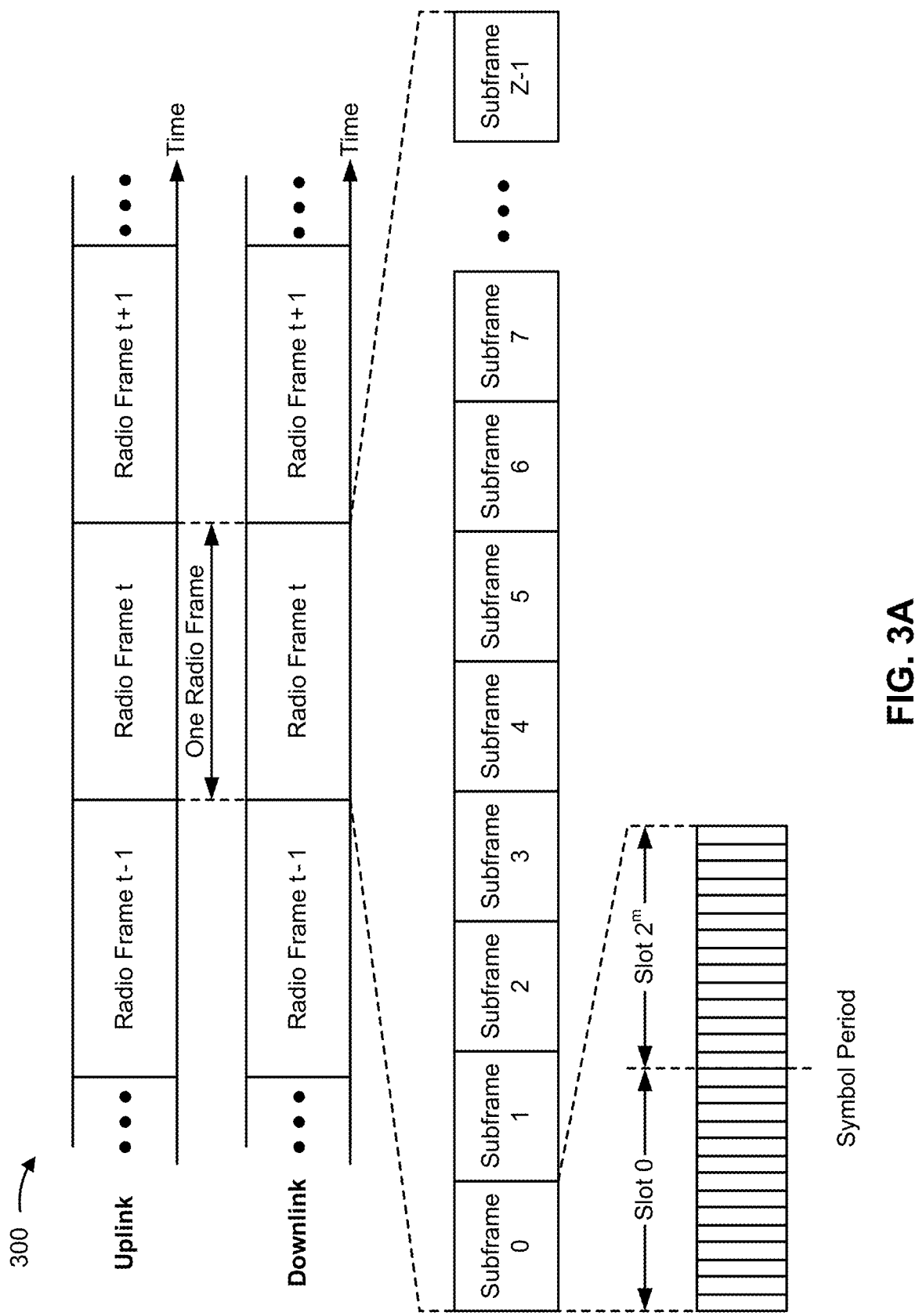
FIG. 3A is a block diagram conceptually illustrating an example of a frame structure in a wireless communication network, in accordance with various aspects of the present disclosure.

FIG. 3A is a block diagram conceptually illustrating an example of a frame structure 300 in a wireless communication network. In some aspects, frame structure 300 may be for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indexes of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indexes of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a PSS, an SSS, and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B. In some aspects, a UE may perform one or more measurements associated with the SS block transmitted from the base station and may perform beam selection and/or a RACH procedure based at least in part on the one or more measurements.

Figure 3B:
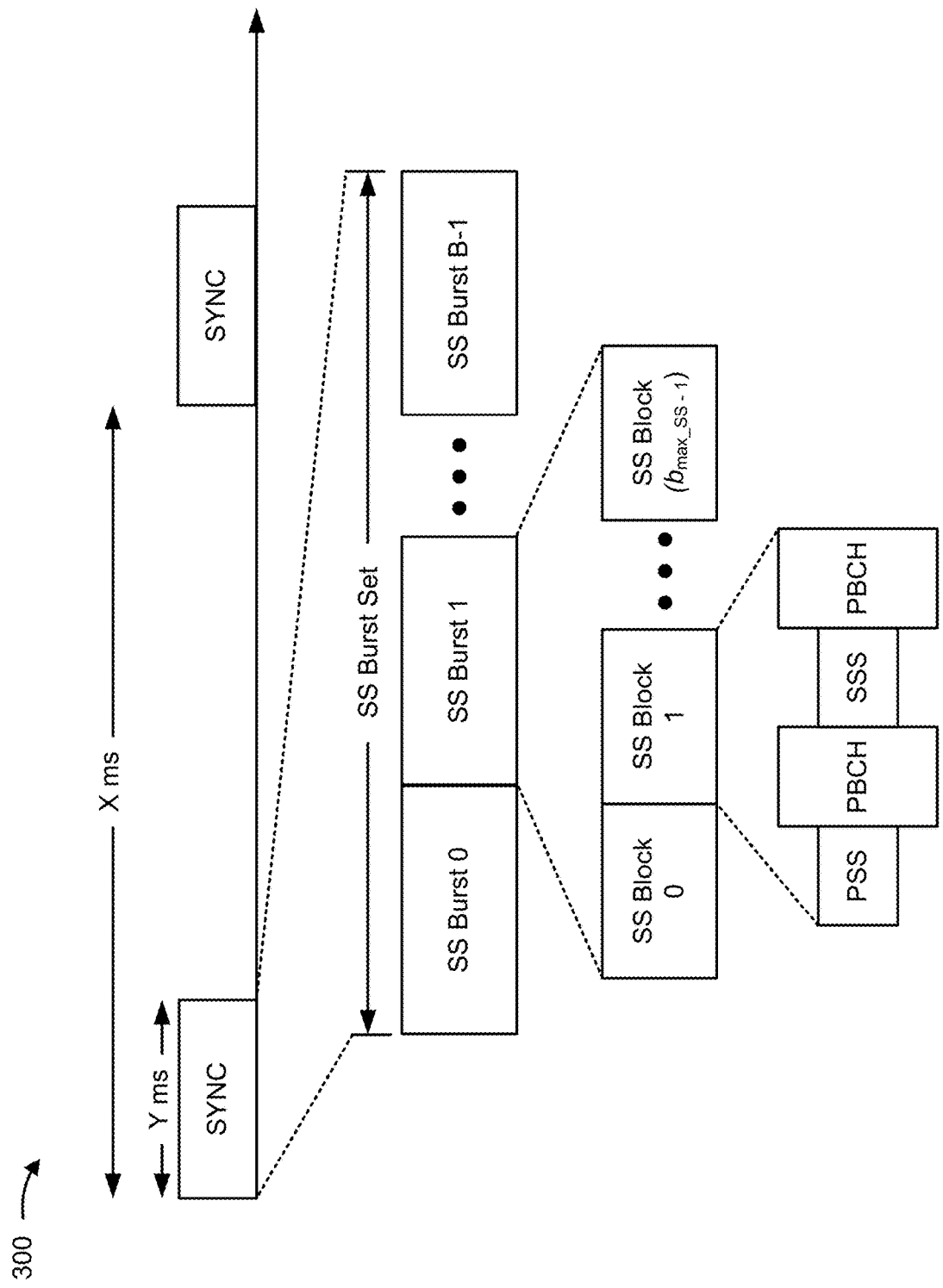
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max}$ ss−1, where $b_{max}$ ss−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols). In some aspects, instead of PSS, SSS and PBCH all being separate OFDM symbols, the space above and below the SSS may also be used for PBCH.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B and C may be configurable for each slot. The base station may transmit traffic data and/or other data on the PDSCH in the remaining symbol periods of each slot. The system information may include an indication of one or more resource sets of beams associated with the BS, an indication of one or more RACH occasions associated with an SS block, an indication of resource element ratios that indicate various ratios for time-frequency resources reserved for RACH communications relative to available time-frequency resources in one or more physical uplink channels associated with the base station, and/or the like.

As indicated above, FIGS. 3A and 3B are provided as examples. Other examples may differ from what is described with regard to FIGS. 3A and 3B.

FIGS. 4A-4F are diagrams illustrating one or more examples 400 of UCI configuration for RACH, in accordance with various aspects of the present disclosure. As shown in FIGS. 4A-4F, the one or more examples 400 may include communications between a user equipment (e.g., UE 120) and a base station (e.g., BS 110). In some aspects, BS 110 and UE 120 may be included in a wireless network (e.g., wireless network 100).

Figure 4A:
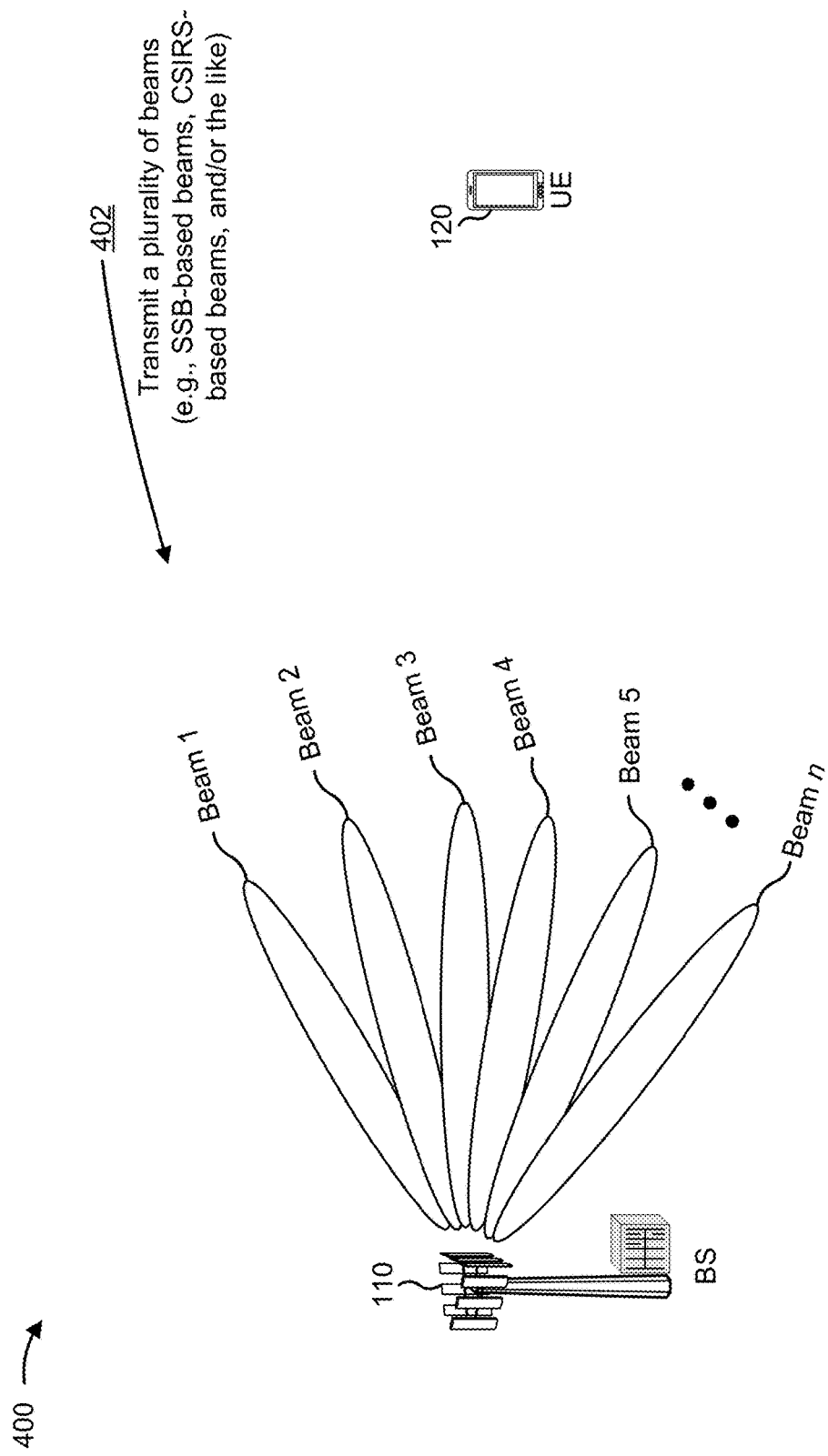

As shown in FIG. 4A, and by reference number 402, BS 110 may transmit a plurality of beams (e.g., Beam 1 through Beam n). Each beam, of the plurality of beams, may be associated with a beam type. For example, a beam on which BS 110 transmits one or more SSBs may be referred to as an SSB-based beam. As another example, a beam on which BS 110 transmits one or more CSIRSs may be referred to as a CSIRS-based beam. In some aspects, CSIRS-based beams may be used for contention-free RACH procedures (e.g., where UE 120 is assigned a cell random access temporary identifier (C-RNTI) associated with BS 110 and/or UE 120 and BS 110 are timing synchronized). In some aspects, SSB-based beams may be used for contention-free and contention-based RACH procedures (e.g., where UE 120 is communicatively connecting to BS 110 for the first time after a restart, where UE 120 is resetting timing synchronization with BS 110, and/or the like).

Figure 4B:
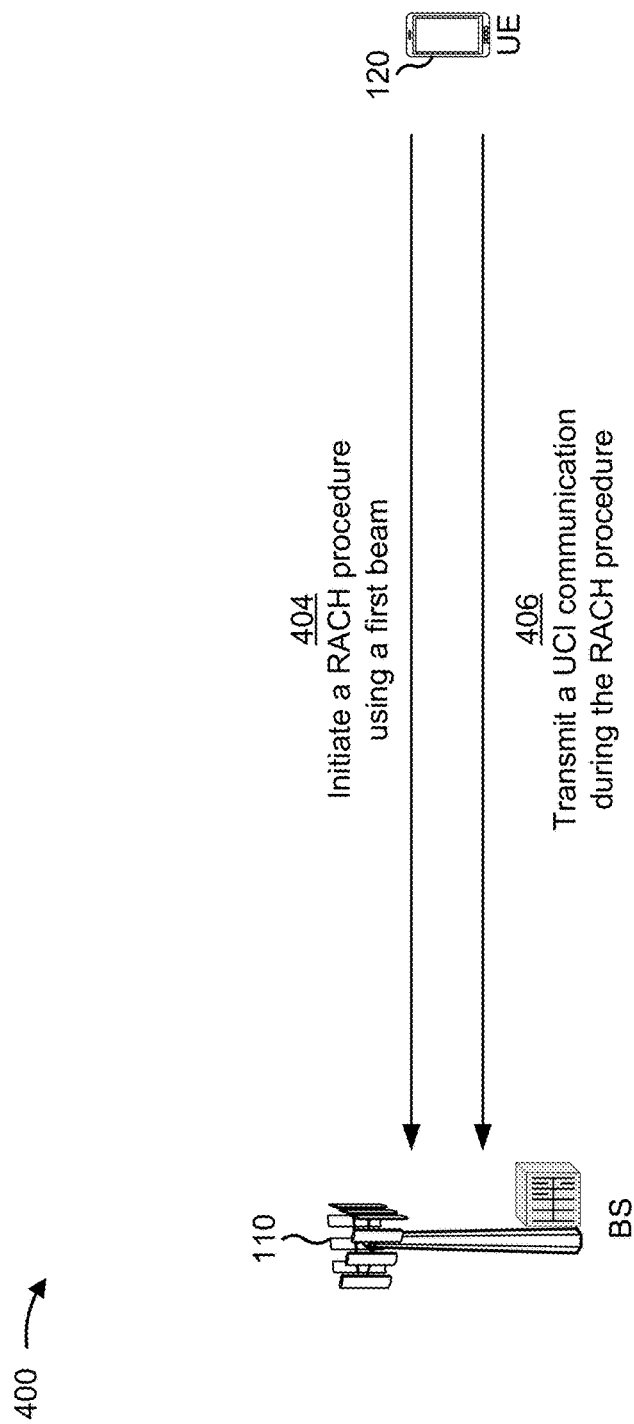

As shown in FIG. 4B, and by reference number 404, BS 110 and UE 120 may establish a connection using a RACH procedure, such as a four-step RACH procedure, a two-step RACH procedure, and/or the like. For example, UE 120 may initiate the RACH procedure by transmitting, to BS 110, a RACH communication. The RACH communication may include a msg1 communication in a four-step RACH procedure, a msgA communication in the two-step RACH procedure, and/or the like. In some aspects, UE 120 may select a RACH signature (e.g., a RACH occasion and a RACH preamble in the RACH occasion) for the RACH communication. The RACH signature may be used to uniquely identify UE 120 during the RACH procedure.

In some aspects, UE 120 may select a RACH occasion, in which to transmit the RACH communication, based at least in part on the one or more SSBs and/or CSIRSs transmitted on the plurality of beams associated with BS 110. For example, UE 120 may perform one or more measurements (e.g., an RSRP measurement, an RSSI measurement, an RSRQ measurement, and/or the like) of the SSBs and/or CSIRSs transmitted on the plurality of beams, may determine that a measurement associated with an SSB or CSIRS satisfies a measurement threshold, and may select the beam, associated with the SSB or CSIRS, for initiating the RACH procedure based at least in part on determining that the measurement satisfies the measurement threshold. In some aspects, the beam on which UE 120 initiates the RACH procedure may be referred to as a default beam. UE 120 may identify a RACH occasion associated with the default beam, and may transmit the RACH communication in the RACH occasion to initiate the RACH procedure using the default beam. In some aspects, UE 120 may select the default beam based at least in part on the associated SSB or CSIRS being the earliest SSB or CSIRS, transmitted in the RACH occasion, with a measurement that satisfies the measurement threshold.

In some aspects, while UE 120 and BS 110 continue to perform the RACH procedure, UE 120 may continue to measure the plurality of beams. In this way, UE 120 may provide information associated with the plurality of beams (e.g., information identifying one or more beams of the plurality of beams, information identifying one or more measurements associated with the one or more beams, information identifying a preferred beam of the plurality of beams, and/or the like) to BS 110. BS 110 may use the information associated with the plurality of beams to transition UE 120 over to another beam during the RACH procedure (e.g., a preferred beam), to perform CSIRS configuration and/or beam refinement, and/or the like.

As further shown in FIG. 4B, and by reference number 406, UE 120 may transmit, to BS 110, the information associated with the plurality of beams. In some aspects, UE 120 may transmit the information associated with the plurality of beams in a UCI communication during the RACH procedure. UE 120 may include the UCI communication in a RACH communication, such as a msg3 communication in a four-step RACH procedure, a msgA communication in a two-step RACH procedure, and/or the like. In some aspects, UE 120 may transmit the UCI over a PUCCH, a PUSCH (e.g., which may be referred to as a UCI piggyback on PUSCH), and/or as part of a MAC communication (e.g., as part of a MAC protocol data unit (PDU), a part of a MAC-CE, and/or the like). If UE 120 transmits the UCI communication as part of a MAC communication, UE 120 may generate the UCI communication such that reserve or padding bits are added to the MAC communication for byte alignment or may re-encode the MAC communication by including additional information in the UCI communication such that fewer or no reserve or padding bits are needed for byte alignment.

FIG. 4C illustrates various example configurations for the UCI communication. UE 120 may use other configurations of the UCI communication for transmitting the information associated with the plurality of beams to BS 110. As shown in FIG. 4C, a first example configuration (e.g., UCI Communication—Example 1) may include an indication of one or more beams associated with BS 110. The one or more beams indicated in the UCI communication may include the default beam (e.g., the beam on which UE 120 initiated the RACH procedure), may include the preferred beam of UE 120, may include one or more other beams, and/or the like. The indication of the one or more beams may include respective indexes associated with the one or more beams. The respective indexes may include SSB indexes, CSIRS indexes, and/or the like.

In some aspects, the indexes associated with the one or more beams may be included in one or more resource sets associated with BS 110. In this case, the UCI communication may indicate the one or more beams by indexing into the one or more resource sets. In some aspects, a resource set may include a subset of the maximum allowable beams that may be configured for BS 110 (e.g., a subset of all of the beams on which BS 110 is permitted to use). For example, a resource set may include one or more beams on which BS 110 is configured to transmit. As another example, a resource set, of the one or more resource sets of beams, may include a subset of the beams on which BS 110 is configured to transmit. In this way, the quantity of bits that is needed to identify beams in a resource set is fewer relative to if the UCI communication were to index into the entire set of allowable beams for BS 110, which reduces the size of the UCI communication. To index into a set of beams may refer to providing an index value that is associated with a corresponding beam. In these cases, an index may be indicated in the UCI communication, and the index may specify a value. The value may be included or identified in a set of beams such that a beam in the set of beams may be associated with the index. Thus, the beam may be identified from the set of beams by the index value associated with the beam.

In some aspects, BS 110 may identify the one or more beams based at least in part on the indication of the one or more beams in the UCI. For example, BS 110 may identify the respective indexes, of the one or more beams, indicated in the UCI communication, and may use the respective indexes to search the one or more resource sets of beams to identify the one or more beams that are associated with the respective indexes.

As shown in FIG. 4C, a second example configuration (e.g., UCI Communication—Example 2) may include an indication of one or more beams associated with BS 110 and an indication of one or more measurements (e.g., RSRP measurements, RSRQ measurements, RSSI measurements, and/or the like) associated with the one or more beams. The one or more measurements may include a measurement associated with the default beam, a measurement associated with the preferred beam, one or more measurements associated one or more other beams associated BS 110, and/or the like.

In some aspects, UE 120 may configure the UCI communication such that the indication of the one or more measurements is explicit. In this case, each measurement may be indicated by an actual measurement value for a respective beam. However, to reduce the size of the UCI communication, UE 120 may configure the UCI communication such that one measurement is explicitly indicated and the remaining measurements are implicitly indicated as a differential, delta, or offset relative to the explicitly indicated measurement. In this case, an implicit indication (e.g., two bits) may occupy fewer bits than the explicit indication (e.g., seven bits). BS 110 may identify the explicit indication of the measurement in the UCI communication, may identify the implicit indications of the remaining measurements in the UCI communication, and may determine the actual measurement values for the remaining measurements based at least in part on the differentials associated with the remaining measurements. Note that the bitwidths used for the measurements may be different from those used for L1-RSRP reporting in connected mode.

In some aspects, the measurement that is explicitly indicated may be the largest (or smallest) measurement of the one or more measurements. In this case, the remaining measurements may lower (or higher) relative to the largest (or smallest) measurement, and the implicit indication of the remaining measurements may indicate respective differences between the largest (or smallest) measurement and the remaining measurements. In some aspects, the measurement that is explicitly indicated may be associated with the default beam. In this case, the remaining measurements may be larger or smaller relative to the measurement associated with the default beam. Accordingly, UE 120 may add one or more additional bits to indicate whether a differential between a remaining measurement and the measurement associated with the default beam is negative or positive.

As shown in FIG. 4C, a third example configuration (e.g., UCI Communication—Example 3) may include an indication of one or more beams associated with BS 110, an indication of one or more measurements associated with the one or more beams, and an indication of a preferred beam. In this case, the indication of the preferred beam may include one or more bits that indicate whether the largest measurement of the one or more measurements is associated with the preferred beam, that indicate an index associated with the preferred beam, and/or the like. In this way, if the UCI communication includes an indication of more beams than just the preferred beam, BS 110 may identify the preferred beam based at least in part on the indication of the preferred beam. If the UCI communication does not include an indication of a preferred beam, BS 110 may determine that the beam associated with the largest measurement indicated in the UCI communication is the preferred beam.

As shown in FIG. 4C, a fourth example configuration (e.g., UCI Communication—Example 4) may include an indication of one or more beams associated with BS 110 and an indication of one or more measurements associated with the one or more beams. In this case, BS 110 may determine that the use of the default beam for initiating the RACH procedure is an implicit indication of the default beam and, accordingly, the default beam may be omitted from the indication of the one or more beams. While, this may reduce the size of the UCI communication, the UCI communication may become unparseable due to a shift in the indexes associated with the one or more beams. To ensure that the UCI communication is still parseable, UE 120 may include an indication of an order of the one or more beams in the UCI communication, which may be based at least in part on a shift of the order of the one or more beams due to the beam, on which the RACH procedure was initiated, not being included in the one or more beams indicated in the UCI communication.

Alternatively, if the default beam is the only beam indicated in the UCI communication, or is indicated along with at least one other beam associated with a measurement that is larger relative to a measurement of the default beam, UE 120 may move the indication of the default beam to a fixed location in the UCI communication (e.g., first location, last location). UE 120 may then remove the index associated with the default beam and the UCI communication may still be parseable by BS 110. If a list with successive differentials of measurements associated with the one or more beams is used, an exception may be implemented for the default beam, which may use differentials relative to a first index in the list to allow moving the index of the default beam a to fixed location.

Figure 4D:
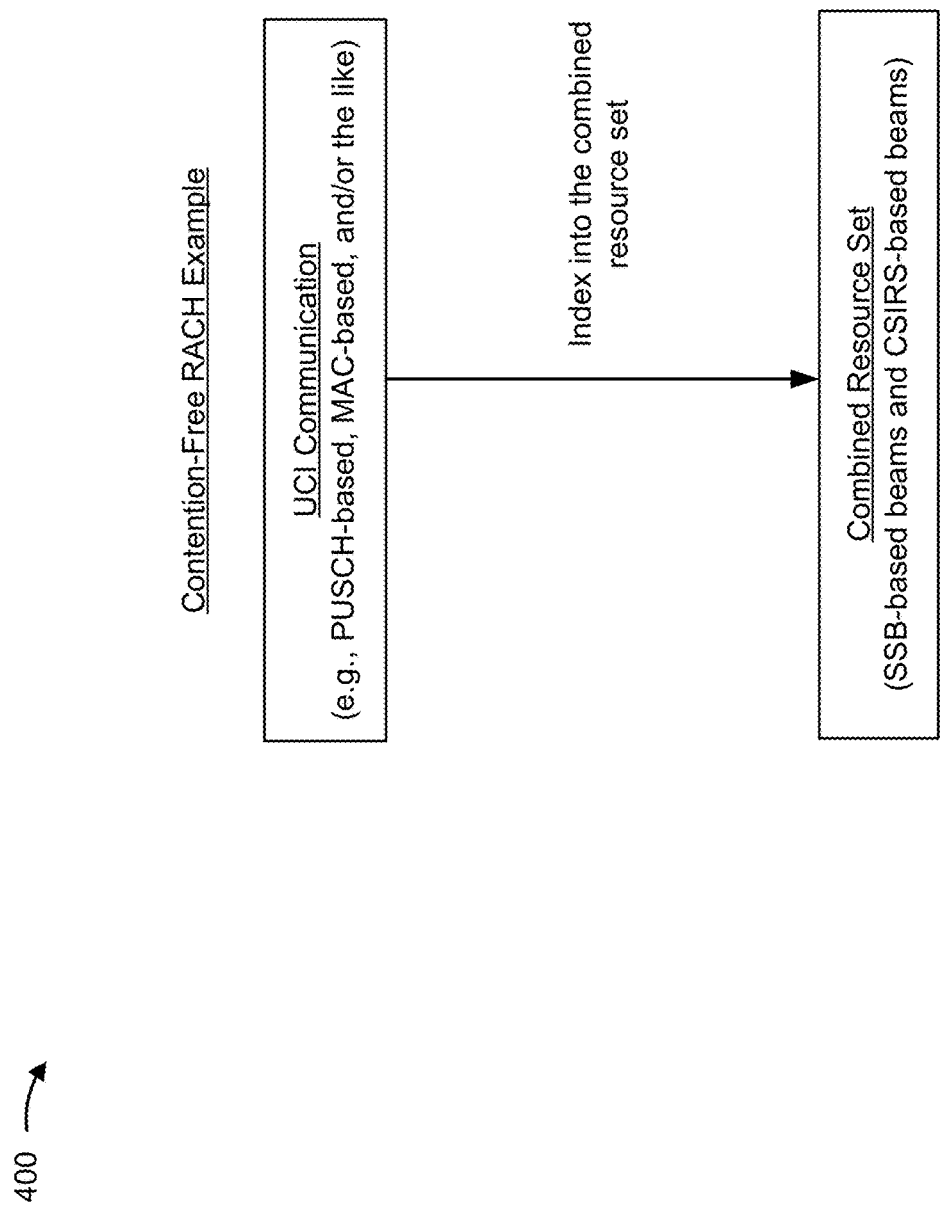
Figure 4E:
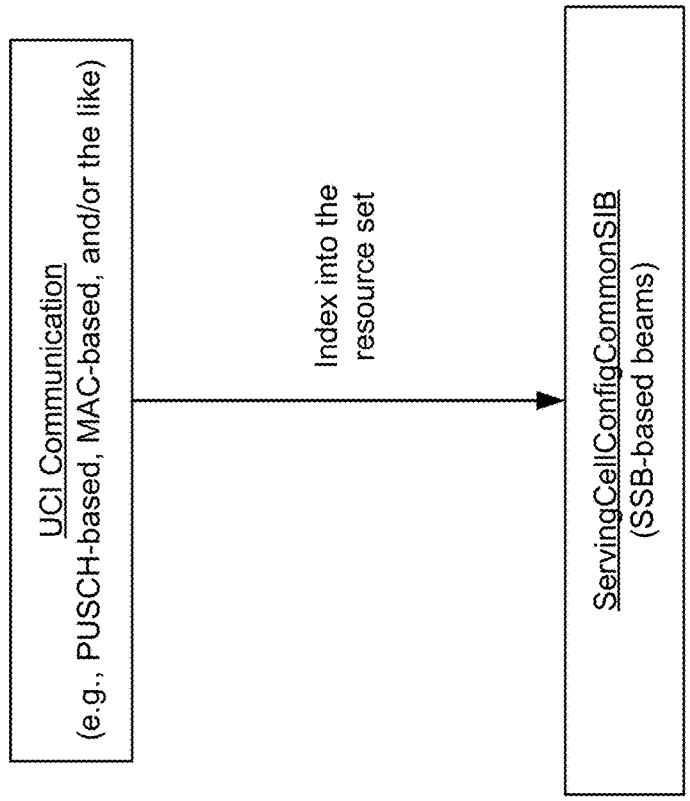
Figure 4F:
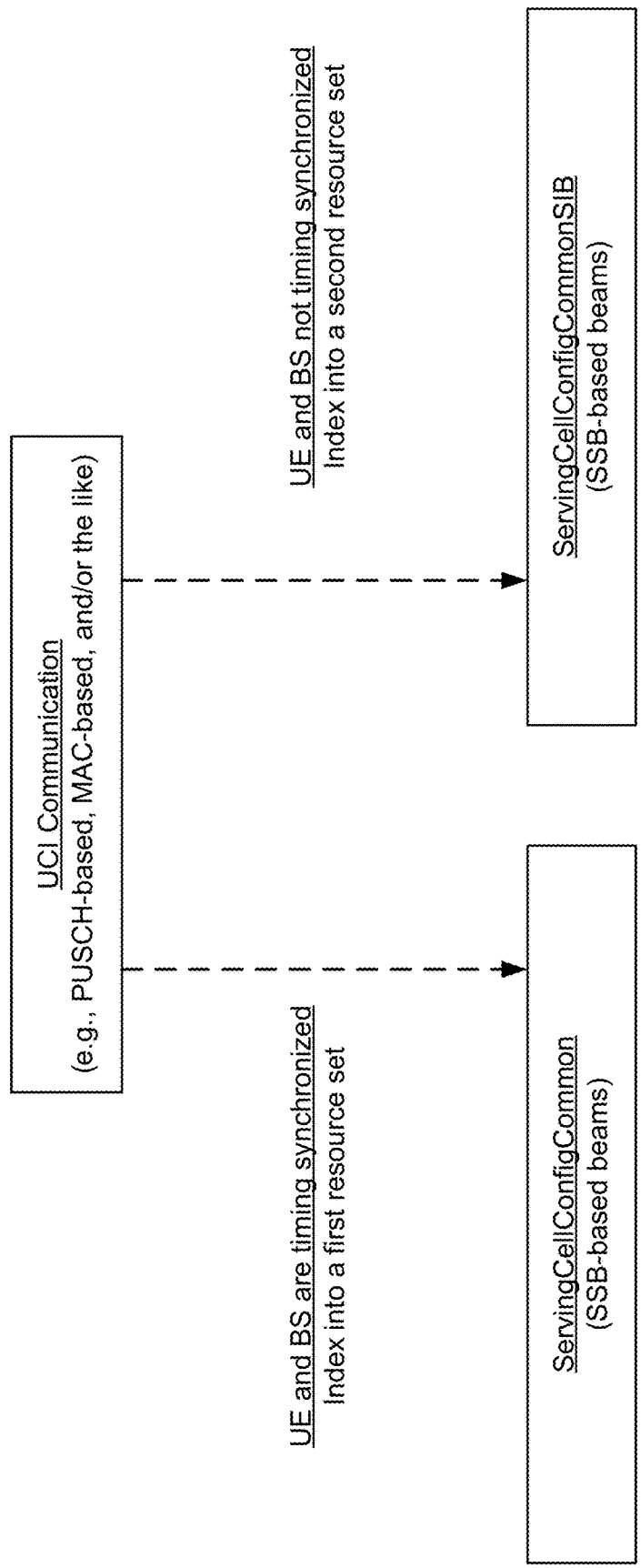

FIGS. 4D-4F illustrate various examples of resource sets of beams into which a UCI communication may index. Other implementations of resource sets may be used. As shown in FIG. 4D, in a contention-free RACH example, a resource set of beams may include a combined resource set, which may include indexes associated with one or more SSB-based beams (e.g., SSB indexes) and indexes associated with one or more CSIRS-based beams (e.g., CSIRS indexes) associated with BS 110. In this case, the UCI communication may index into the combined resource set by indicating respective indexes associated with one or more SSB-based beams associated with BS 110 and/or one or more CSIRS-based beams associated with BS 110. Each index indicated by the UCI communication may index into the combined resource set by indicating or specifying a value associated with a corresponding beam (e.g., an SSB-based beam or a CSIRS-based beam) specified in the combined resource set.

BS 110 may receive the UCI communication and may identify one or more beams indicated in the UCI communication by identifying the SSB indexes and the CSIRS indexes specified by the UCI communication and identifying the beams corresponding to the SSB indexes and the CSIRS indexes in the combined resource set. The bitwidths used for the measurement quantities (eg, RSRP) may be different depending on whether the resource set of beams contains only SSB-based beams, only CSI-RS-based beams, or both. When the resource set of beams includes both SSB and CSI-RS-based beams indexed by a common indexing, the bitwidths for the measurement quantities for different beams within the same measurement report could also be different. The bitwidth for each beam may depend on whether the beam is SSB-based or CSI-RS-based, or in case of differential reporting, whether the beam with respect to which the differential measurement is reported is SSB-based or CSI-RS-based, or both. Since the beam-index uniquely identifies the beam, including whether it is SSB-based or CSI-RS-based, the beam report can be constructed to remain parseable even with such varying bitwidths.

In some aspects, the indexes in the combined resource set may be ordered by index type. For example, the SSB indexes, included in the combined resource set, may be ordered prior to the CSIRS indexes included in the combined resource set. As another example, the CSIRS indexes, included in the combined resource set, may be ordered prior to the SSB indexes included in the combined resource set. In some aspects, the indexes in the combined resource set may be ordered based at least in part on a particular one or more frames and/or subframes associated with BS 110. In this case, the indexes in the combined resource set may be ordered based at least in part on a beam order in the one or more frames and/or subframes. In some aspects, the indexes in the combined resource set may be ordered based at least in part on a beam order in another time interval, such as a particular or specified time interval, a configured time interval, and/or another time interval.

As shown in FIG. 4E, in a contention-based RACH example, a resource set of beams may include indexes associated with one or more SSB-based beams (e.g., SSB indexes) associated with BS 110. The one or more SSB-based beams may include a set of transmitted SSB beams indicated in a SIB, transmitted by BS 110, that UE 120 is to receive in order to initiate the RACH procedure. For example, and as indicated in FIG. 4E, the SIB may include one or more information elements (IEs) indicating the one or more SSB-based beams, such as a ServingCellConfigCommonSIB IE, an ssb-PositionsInBurst IE (which may be a sub-field of the ServingCellConfigCommonSIB IE), and/or the like. In this case, the UCI communication may index into the resource set by indicating respective indexes associated with one or more SSB-based beams associated with BS 110, where each SSB-based beam is associated with an index by which the SSB-based beam can be identified. BS 110 may receive the UCI communication and may identify one or more beams indicated in the UCI communication by identifying the SSB indexes specified by the UCI communication and identifying the beams corresponding to the SSB indexes in the resource set.

As shown in FIG. 4F, in a contention-based RACH example, the UCI communication may index into one of a plurality of resource sets. In this case, the plurality of resource sets may include a first resource set of beams that include indexes associated with a first plurality of SSB-based beams (e.g., SSB indexes) associated with BS 110, and a second resource set of beams that include indexes associated with a second plurality of SSB-based beams associated with BS 110. UE 120 may configure the UCI communication to index into the first resource set if UE 120 and BS 110 are timing synchronized (e.g., UE 120 has received a timing advance, a timing alignment, and/or the like) or may configure the UCI communication to index into the second resource set if UE 120 and BS 110 are not timing synchronized (e.g., where UE 120 is communicatively connecting to BS 110 for the first time after a restart, where UE 120 is resetting timing synchronization with BS 110, where UE 120 is initiating a beam failure recovery (BFR) procedure, and/or the like).

The first plurality of beams may be indicated in a first SIB or a unicast RRC communication that UE 120 is to receive in order to initiate the RACH procedure using particular RACH resources (e.g., a particular RACH preamble, a particular RACH occasion, and/or the like). For example, and as indicated in FIG. 4F, the first SIB or unicast RRC communication may include one or more IEs indicating the first plurality of beams, such as a ServingCellConfigCommon IE, an ssb-PositionsInBurst IE (for example, within the ServingCellConfigCommon IE), and/or the like. The second plurality of beams may include a set of transmitted SSB beams indicated in a SIB, transmitted by BS 110, that UE 120 is to receive in order to initiate the RACH procedure. For example, and as indicated in FIG. 4F, the SIB may include one or more IEs indicating the first plurality of beams, such as a ServingCellConfigCommonSIB IE, an ssb-PositionsInBurst IE (for example, within the ServingCellConfigCommonSIB IE), and/or the like. Whether the UCI indexes into the first or the second plurality of beams may be determined based on whether UE has or does not have timing synchronization with the gNB, or based on other similar criteria (e.g., whether the UE has or does not have a C-RNTI, etc.).

UE 120 may configure the UCI communication to index into the first resource set by indicating respective indexes associated with one or more SSB-based beams included in the first resource set. BS 110 may receive the UCI communication and may identify one or more beams indicated in the UCI communication by identifying the SSB indexes specified by the UCI communication and identifying the beams corresponding to the SSB indexes in the first resource set. UE 120 may configure the UCI communication to index into the second resource set by indicating respective indexes associated with one or more SSB-based beams included in the second resource set. BS 110 may receive the UCI communication and may identify one or more beams indicated in the UCI communication by identifying the SSB indexes specified by the UCI communication and identifying the beams corresponding to the SSB indexes in the second resource set.

In some aspects, UE 120 may configure the UCI communication based at least in part on a permitted size for the UCI communication. In some aspects, UE 120 may determine the permitted size of the UCI communication (e.g., in bits, in resource elements, and/or the like) based at least in part on various factors indicated by BS 110. The factors may include an alpha factor, a beta factor, and/or the like. The alpha factor may specify a maximum permitted size of the UCI communication (e.g., a maximum permitted quantity of bits or resource elements that may be included in the UCI communication). The beta factor may specify a resource element ratio for the UCI communication. The resource element ratio may indicate a ratio between a total quantity of resource elements included in a physical uplink channel (e.g., PUSCH, PUCCH, and/or the like) and a quantity of resource elements, of the physical uplink channel, that is permitted to be used for the UCI communication.

In some aspects, BS 110 may indicate the alpha factor and/or the beta factor, for the UCI communication, in a master information block (MIB), in a SIB, in a remaining minimum system information (RMSI) communication, in another system information (OSI) communication, in an RRC communication, in a MAC-CE communication, in a downlink control information (DCI) communication, in a random access response (RAR) (e.g., msg2) grant, and/or the like. In some aspects, BS 110 may indicate a set of candidate beta factors in a MIB, SIB, RMSI communication, OSI communication, and/or the like, and may index into the set of candidate beta factors (e.g., via an RRC communication, MAC-CE communication, DCI communication, RAR grant, and/or the like) to select a particular beta factor that UE 120 is to use.

In some aspects, BS 110 may configure UE 120 (e.g., via MIB, SIB, RMSI communication, OSI communication, RRC communication, MAC-CE communication, DCI communication, and/or the like) to use the same beta factor or different beta factors for different types of RACH communications. For example, BS 110 may configure UE 120 to use the same beta factor for the transmission of a UCI communication in a RACH communication and in a retransmission of a RACH communication. As another example, BS 110 may configure UE 120 to use independent and/or different beta factors for the transmission of a UCI communication in a RACH communication and in a retransmission of a RACH communication. In this case, the beta factor for the UCI communication in the retransmission of the RACH communication may be indicated by a beta factor offset (e.g., between the beta factor for the transmission of the RACH communication and the beta factor for the retransmission of the RACH communication) or explicit beta factor value.

As another example, BS 110 may configure UE 120 to use different beta factors for the transmission of a UCI communication in a msg3 communication and for the transmission of a UCI communication in a msgA communication. In this case, UE 120 may transmit the UCI communication, using a first beta factor, in a msgA communication, may receive, from BS 110, a fallback indication based at least in part on transmitting the UCI communication in the msgA communication (e.g., which may occur if BS 110 does not receive the msgA communication or is unable to decode the msgA communication), and may transmit the UCI communication, using a second beta factor (e.g., which may be different from the first beta factor), in a msg3 communication based at least in part on receiving the fallback indication.

In some aspects, UE 120 may transmit a multi-part UCI communication in a RACH communication. In this case, BS 110 may configure UE 120 to configure each part of the multi-part UCI communication based at least in part on a respective beta factor. In some aspects, UE 120 may perform a RACH procedure for a plurality of RATs and/or a plurality component carriers (CCs). In this case, UE 120 may transmit respective UCI communications for each RAT and/or CC. In some aspects, when transmitting respective UCI communications for a plurality of RATs and/or CCs, UE 120 may concatenate the respective UCI communications and transmit the concatenated respective UCI communications as the UCI communication. In some aspects, UE 120 may transmit respective UCI communications for subsets or groups of RATs and/or CCs. In some aspects, UE 120 may transmit respective UCI communications for one or more RATs and/or CCs and may transmit respective UCI communications for one or more subsets or groups of RATs and/or CCs. In some aspects, the configuration for UCI communications for RATs and/or CCs may be determined based at least in part on the RACH occasion and/or preamble index that UE 120 uses to initiate the RACH procedure, may be indicated in a MIB, a SIB, an RMSI communication, an OSI communication, an RRC communication, a MAC-CE communication, a DCI communication, and/or the like.

In this way, UE 120 may transmit a UCI communication to BS 110 during a RACH procedure. The UCI communication may include various types of information, such as an indication of one or more beams associated with BS 110, an indication of one or more measurements for the one or more beams, an indication of a preferred beam for UE 120, and/or the like. UE 120 may configure the UCI communication such that the indication of the one or more beams indexes in to a resource set of beams. The resource set of beams may include a subset of the maximum quantity of beams that may be configured for BS 110, may include different types of beams, and/or the like. In this way, the UCI communication may indicate beams that are associated with different beam types in the same report, may indicate the one or more beams by indexing into a smaller resource set of beams, which reduces the quantity of bits needed to indicate the one or more beams.

Moreover, in this way, UE 120 may further reduce the size of the UCI communication by configuring the UCI communication such that the beam, on which the RACH procedure was initiated, is not included in the indication of the one or more beams. In this case, the use of the beam for initiating the RACH procedure may function as an implicit indication of the beam. To ensure that the UCI communication is still parseable, UE 120 may include an indication of an order of the one or more beams in the UCI communication, which may be based at least in part on a shift of the order of the one or more beams due to the beam, on which the RACH procedure was initiated, not being included in the one or more beams indicated in the UCI communication.

Further, in this way, UE 120 may configure the UCI communication such that the UCI communication indicates a preferred beam (and the associated measurement) of UE 120. Instead of BS 110 assuming that the beam with the greatest measurement is the preferred beam, UE 120 may use the UCI communication to select different beams (e.g., other than the beam with the greatest measurement) as the preferred beam (e.g., for power consumption considerations and/or the like).

As indicated above, FIGS. 4A-4F are provided as examples. Other examples may differ from what is described with respect to FIGS. 4A-4F.

FIG. 5 is a diagram illustrating an example process 500 performed, for example, by a UE, in accordance with various aspects of the present disclosure. Example process 500 is an example where a UE (e.g., UE 120) performs operations associated with UCI configuration for RACH.

As shown in FIG. 5, in some aspects, process 500 may include initiating a RACH procedure using a first beam associated with a BS (block 510). For example, the UE (e.g., using receive processor 258, transmit processor 264, controller/processor 280, memory 282, and/or the like) may initiate a RACH procedure using a first beam associated with a BS, as described above.

As further shown in FIG. 5, in some aspects, process 500 may include transmitting, to the BS and during the RACH procedure, a UCI communication that indexes into a resource set of beams to indicate one or more second beams associated with the BS (block 520). For example, the UE (e.g., using receive processor 258, transmit processor 264, controller/processor 280, memory 282, and/or the like) may transmit, to the BS and during the RACH procedure, a UCI communication that indexes into a resource set of beams to indicate one or more second beams associated with the BS, as described above.

Process 500 may include additional aspects, such as any single implementation or any combination of aspects described below and/or in connection with one or more other processes described elsewhere herein.

In a first aspect, transmitting the UCI communication comprises at least one of transmitting the UCI communication in a physical uplink shared channel, transmitting the UCI communication in a MAC PDU, or transmitting the UCI communication in a MAC-CE. In a second aspect, alone or in combination with the first aspect, the RACH procedure comprises a contention-free RACH procedure, the resource set of beams comprises a combined resource set of one or more SSB-based beams and one or more CSIRS-based beams, and the UCI communication indexes into the resource set of beams by indicating at least one of a first index, into the combined resource set of one or more SSB-based beams and one or more CSIRS-based beams, associated with an SSB-based beam of the one or more second beams, or a second index, into the combined resource set of one or more SSB-based beams and one or more CSIRS-based beams, associated with a CSIRS-based beam of the one or more second beams.

In a third aspect, alone or in combination with one or more of the first or second aspects, one or more SSB-based beams, included in the combined resource set of one or more SSB-based beams and one or more CSIRS-based beams, are ordered before one or more CSIRS-based beams included in the combined resource set of one or more SSB-based beams and one or more CSIRS-based beams. In a fourth aspect, alone or in combination with one or more of the first through third aspects, one or more C SIRS-based beams, included in the combined resource set of one or more SSB-based beams and one or more CSIRS-based beams, are ordered before one or more SSB-based beams included in the combined resource set of one or more SSB-based beams and one or more C SIRS-based beams.

In a fifth aspect, alone or in combination with one or more of the first through fourth aspects, a beam order, of the combined resource set of one or more SSB-based beams and one or more C SIRS-based beams, is based at least in part on a beam order in one or more subframes associated with the BS. In a sixth aspect, alone or in combination with one or more of the first through fifth aspects, the RACH procedure comprises a contention-based RACH procedure, the resource set of beams comprises a plurality of SSB-based beams, and the UCI communication indexes into the resource set of beams by indicating respective indexes, into the resource set of beams, associated with one or more SSB-based beam of the plurality of SSB-based beams.

In a seventh aspect, alone or in combination with one or more of the first through sixth aspects, the plurality of SSB-based beams comprises a set of transmitted SSB-based beams indicated in a SIB that the UE is to receive in order to initiate the RACH procedure. In an eighth aspect, alone or in combination with one or more of the first through seventh aspects, the RACH procedure comprises a contention-based RACH procedure, the resource set of beams is a first resource set of beams included in a plurality of resource sets of beams, the first resource set of beams comprises a first plurality of SSB-based beams, and a second resource set of beams, of the plurality of resource sets of beams, comprises a second plurality of SSB-based beams.

In a ninth aspect, alone or in combination with one or more of the first through eighth aspects, if the UE and the BS are timing synchronized, the UCI communication indexes into the first resource set of beams to indicate the one or more second beams, or if the UE and the BS are not timing synchronized, the UCI communication indexes into the second resource set of beams to indicate the one or more second beams. In a tenth aspect, alone or in combination with one or more of the first through ninth aspects, the first plurality of SSB-based beams is indicated in a first SIB or a unicast RRC communication that the UE is to receive in order to initiate the RACH procedure using particular RACH resources, and the second plurality of SSB-based beams is indicated in a second SIB that the UE is to receive in order to initiate the RACH procedure.

In an eleventh aspect, alone or in combination with one or more of the first through tenth aspects, the resource set of beams comprises one or more SSB-based beams associated with a RACH signature used by the UE in the RACH procedure. In a twelfth aspect, alone or in combination with one or more of the first through eleventh aspects, the one or more second beams do not include the first beam. In a thirteenth aspect, alone or in combination with one or more of the first through twelfth aspects, the UCI communication indicates one or more RSRP measurements associated with the one or more second beams, the one or more RSRP measurements indicating as a differential relative to an RSRP measurement associated with the first beam. In a fourteenth aspect, alone or in combination with one or more of the first through thirteenth aspects, the UCI communication explicitly indicates a preferred beam of the one or more second beams. In a fifteenth aspect, alone or in combination with one or more of the first through fourteenth aspects, the one or more second beams comprises a preferred beam.

In a sixteenth aspect, alone or in combination with one or more of the first through fifteenth aspects, the UCI communication explicitly indicates an RSRP measurement associated with the preferred beam. In a seventeenth aspect, alone or in combination with one or more of the first through sixteenth aspects, the UCI communication implicitly indicates a RSRP measurement, associated with the preferred beam, as a differential relative to an RSRP measurement associated with the first beam. In an eighteenth aspect, alone or in combination with one or more of the first through seventeenth aspects, the UCI communication explicitly indicates a RSRP measurement associated with the first beam and an RSRP measurement associated with the preferred beam.

In a nineteenth aspect, alone or in combination with one or more of the first through eighteenth aspects, the UCI communication explicitly indicates an RSRP measurement associated with the first beam, and the UCI communication implicitly indicates an RSRP measurement associated with the preferred beam as a differential relative to the RSRP measurement associated with the first beam. In a twentieth aspect, alone or in combination with one or more of the first through nineteenth aspects, an index of the first beam is located at a fixed location in the resource set of beams, and the index of the first beam is not indicated in the one or more second beams. In a twenty-first aspect, alone or in combination with one or more of the first through twentieth aspects, the UCI communication includes a field that indicates an order of the one or more second beams, and the order is based at least in part on the index of the first beam not being indicated in the one or more second beams.

In a twenty-second aspect, alone or in combination with one or more of the first through twenty-first aspects, the RACH procedure comprises a four-step RACH procedure, transmitting the UCI communication comprises transmitting the UCI communication in a msg3 communication. In a twenty-third aspect, alone or in combination with one or more of the first through twenty-second aspects, a resource element ratio, associated with the msg3 communication, is indicated in at least one of a RAR grant, MIB, a SIB, a RMSI communication, or a DCI communication. In a twenty-fourth aspect, alone or in combination with one or more of the first through twenty-third aspects, a set of candidate resource element ratios, associated with the msg3 communication, is indicated in at least one of a MIB, a SIB, or a RMSI communication, and a DCI communication or a random access response (RAR) grant indexes into the set of candidate resource element ratios to indicate a resource element ratio, of the set of candidate resource element ratios, for the msg3 communication.

In a twenty-fifth aspect, alone or in combination with one or more of the first through twenty-fourth aspects, a resource element ratio associated with a transmission of the msg3 communication, and a resource element ratio associated with a retransmission of the msg3 communication, are a same resource element ratio. In a twenty-sixth aspect, alone or in combination with one or more of the first through twenty-fifth aspects, a resource element ratio associated with a transmission of the msg3 communication, and a resource element ratio associated with a retransmission of the msg3 communication, are independent resource element ratios. In a twenty-seventh aspect, alone or in combination with one or more of the first through twenty-sixth aspects, a retransmission grant, for the retransmission of the msg3 communication, indicates an offset between the resource element ratio associated with the transmission of the msg3 communication and the resource element ratio associated with the retransmission of the msg3 communication.

In a twenty-eighth aspect, alone or in combination with one or more of the first through twenty-seventh aspects, the RACH procedure comprises a two-step RACH procedure, transmitting the UCI communication comprises transmitting the UCI communication in a msgA communication, receiving, from the BS, a fallback indication based at least in part on transmitting the UCI communication in the msgA communication, and transmitting the UCI communication in a msg3 communication based at least in part on receiving the fallback indication, wherein a resource element ratio, associated with the msgA communication, and a resource element ratio, associated with the msg3 communication, are different resource element ratios.

In a twenty-ninth aspect, alone or in combination with one or more of the first through twenty-eighth aspects, the UCI communication comprises a multi-part UCI communication wherein a first part, of the multi-part UCI communication, is associated with a first resource element ratio and wherein a second part, of the multi-part UCI communication, is associated with a second resource element ratio.

In a thirtieth aspect, alone or in combination with one or more of the first through twenty-ninth aspects, transmitting the UCI communication comprises at least one of transmitting respective UCI communications for a plurality of CCs or transmitting respective UCI communications for a plurality of RATs. In a thirty-first aspect, alone or in combination with one or more of the first through thirtieth aspects, transmitting the respective UCI communications for a plurality of CCs comprises concatenating the respective UCI communications to form the UCI communication and transmitting the UCI communication after concatenating the respective UCI communications.

In a thirty-second aspect, alone or in combination with one or more of the first through thirty-first aspects, transmitting the UCI communication comprises at least one of transmitting respective UCI communications for subsets of a plurality of component carriers (CCs) or transmitting respective UCI communications for subsets of a plurality of RATs.

In a thirty-third aspect, alone or in combination with one or more of the first through thirty-first aspects, the UCI communication indexes into the resource set of beams by indicating respective indexes that identify each of the one or more second beams in the resource set of beams.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
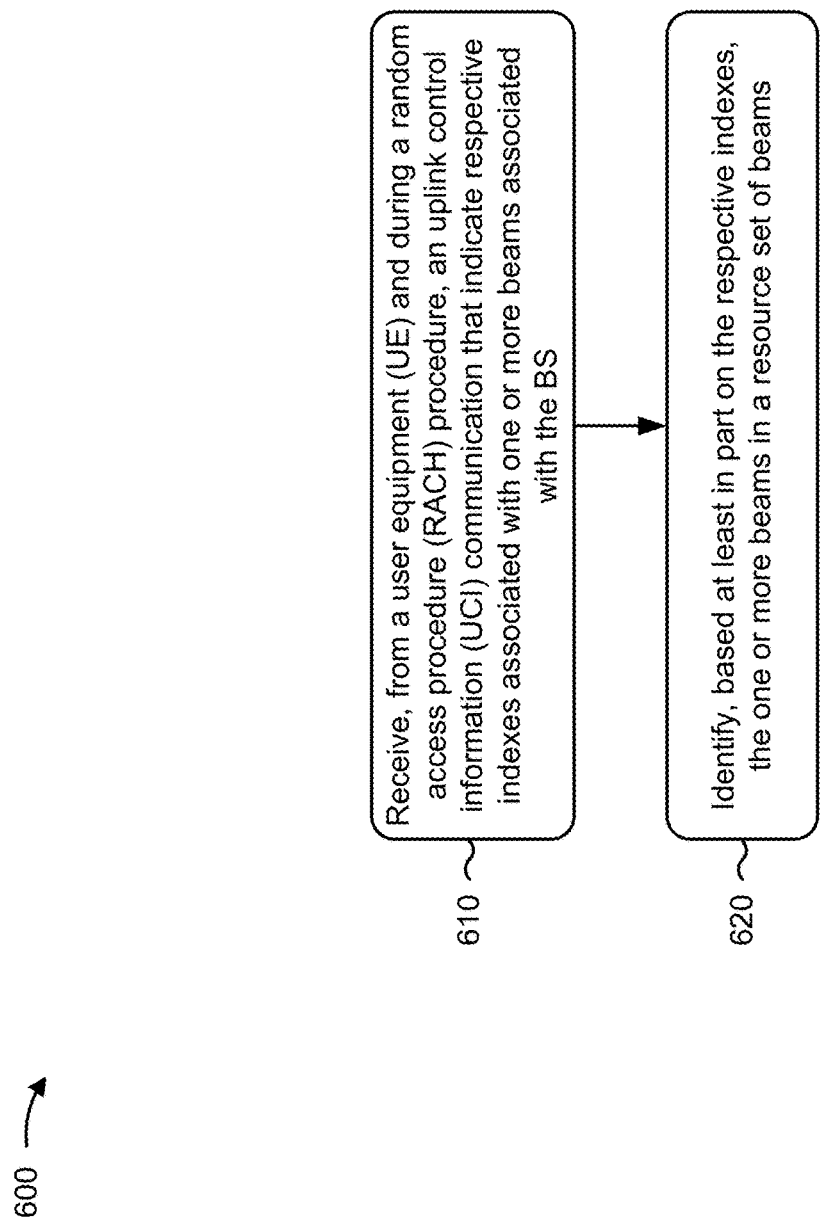
FIG. 6 is a diagram illustrating an example process performed, for example, by a BS, in accordance with various aspects of the present disclosure.

FIG. 6 is a diagram illustrating an example process 600 performed, for example, by a BS, in accordance with various aspects of the present disclosure. Example process 600 is an example where a BS (e.g., BS 110) performs operations associated with UCI configuration for RACH.

As shown in FIG. 6, in some aspects, process 600 may include receiving, from a UE and during a RACH procedure, a UCI communication that indicate respective indexes associated with one or more beams associated with the BS (block 610). For example, the BS (e.g., using transmit processor 220, receive processor 238, controller/processor 240, memory 242, and/or the like) may receive, from a UE and during a RACH procedure, an UCI communication that indicate respective indexes associated with one or more beams associated with the BS, as described above.

As further shown in FIG. 6, in some aspects, process 600 may include identifying, based at least in part on the respective indexes, the one or more beams in a resource set of beams (block 620). For example, the BS (e.g., using transmit processor 220, receive processor 238, controller/processor 240, memory 242, and/or the like) may identify, based at least in part on the respective indexes, the one or more beams in a resource set of beams, as described above.

Process 600 may include additional aspects, such as any single implementation or any combination of aspects described below and/or in connection with one or more other processes described elsewhere herein.

In a first aspect, the UCI communication is included in at least one of a PUSCH, a MAC PDU, or a MAC-CE. In a second aspect, alone or in combination with the first aspect, the RACH procedure comprises a contention-free RACH procedure, the resource set of beams comprises a combined resource set of one or more SSB-based beams and one or more CSIRS-based beams, and identifying the one or more beams in the resource set of beams comprises at least one of identifying, based at least in part on a first index of the respective indexes, an SSB-based beam, of the one or more beams, in the combined resource set of one or more SSB-based beams and one or more CSIRS-based beams, or identifying, based at least in part on a second index of the respective indexes, a CSIRS-based beam, of the one or more beams, in the combined resource set of one or more SSB-based beams and one or more CSIRS-based beams.

In a third aspect, alone or in combination with one or more of the first or second aspect, one or more SSB-based beams, included in the combined resource set of one or more SSB-based beams and one or more CSIRS-based beams, are ordered before one or more CSIRS-based beams included in the combined resource set of one or more SSB-based beams and one or more CSIRS-based beams. In a fourth aspect, alone or in combination with one or more of the first or third aspects, one or more CSIRS-based beams, included in the combined resource set of one or more SSB-based beams and one or more CSIRS-based beams, are ordered before one or more SSB-based beams included in the combined resource set of one or more SSB-based beams and one or more CSIRS-based beams. In a fifth aspect, alone or in combination with one or more of the first or fourth aspects, a beam order, of the combined resource set of one or more SSB-based beams and one or more CSIRS-based beams, is based at least in part on a beam order in one or more subframes associated with the BS.

In a sixth aspect, alone or in combination with one or more of the first or fifth aspects, the RACH procedure comprises a contention-based RACH procedure, the resource set of beams comprises a plurality of SSB-based beams, and the one or more beams comprise one or more SSB-based beams of the plurality of SSB-based beams. In a seventh aspect, alone or in combination with one or more of the first or sixth aspects, the plurality of SSB-based beams comprises a set of transmitted SSB-based beams indicated in a SIB that the UE is to receive in order to initiate the RACH procedure.

In an eighth aspect, alone or in combination with one or more of the first or seventh aspects, the RACH procedure comprises a contention-based RACH procedure, the resource set of beams is a first resource set of beams included in a plurality of resource sets of beams, the first resource set of beams comprises a first plurality of SSB-based beams, and a second resource set of beams, of the plurality of resource sets of beams, comprises a second plurality of SSB-based beams. In a ninth aspect, alone or in combination with one or more of the first or eighth aspects, identifying the one or more beams in the resource set of beams comprises identifying, if the UE and the BS are timing synchronized, the one or more beams in a resource set of beams based at least in part on the first resource set of beams, or identifying, if the UE and the BS are not timing synchronized, the one or more beams in a resource set of beams based at least in part on the second resource set of beams.

In a tenth aspect, alone or in combination with one or more of the first or ninth aspects, the first plurality of SSB-based beams is indicated in a first SIB or a unicast RRC communication that the UE is to receive in order to initiate the RACH procedure using particular RACH resources, and the second plurality of SSB-based beams is indicated in a second SIB that the UE is to receive in order to initiate the RACH procedure. In an eleventh aspect, alone or in combination with one or more of the first or tenth aspects, the resource set of beams comprises one or more SSB-based beams associated with a RACH signature used by the UE in the RACH procedure.

In a twelfth aspect, alone or in combination with one or more of the first or eleventh aspects, the one or more beams do not include a beam on which the RACH procedure was initiated. In a thirteenth aspect, alone or in combination with one or more of the first or twelfth aspects, the UCI communication implicitly indicates one or more RSRP measurements associated with the one or more beams, and process 600 further comprises determining the one or more RSRP measurements based at least in part on a differential, relative to an RSRP measurement associated with a beam on which the RACH procedure was initiated, indicated in the UCI communication. In a fourteenth aspect, alone or in combination with one or more of the first or thirteenth aspects, the UCI communication explicitly indicates a preferred beam of the one or more beams. In a fifteenth aspect, alone or in combination with one or more of the first or fourteenth aspects, the one or more beams comprises a preferred beam.

In a sixteenth aspect, alone or in combination with one or more of the first or fifteenth aspects, the UCI communication explicitly indicates an RSRP measurement associated with the preferred beam. In a seventeenth aspect, alone or in combination with one or more of the first or sixteenth aspects, the UCI communication implicitly indicates an RSRP measurement associated with the preferred beam, and process 600 further comprises determining the RSRP measurement based at least in part on a differential, relative to an RSRP measurement associated with a beam on which the RACH procedure was initiated, indicated in the UCI communication. In an eighteenth aspect, alone or in combination with one or more of the first or seventeenth aspects, the UCI communication explicitly indicates an RSRP measurement associated with a beam on which the RACH procedure was initiated and an RSRP measurement associated with the preferred beam.

In a nineteenth aspect, alone or in combination with one or more of the first or eighteenth aspects, the UCI communication explicitly indicates an RSRP measurement associated with a beam on which the RACH procedure was initiated, and process 600 further comprises determining an RSRP measurement associated with the preferred beam based at least in part on a differential, relative to the RSRP measurement associated with the beam on which the RACH procedure was initiated, indicated in the UCI communication. In a twentieth aspect, alone or in combination with one or more of the first or nineteenth aspects, an index of a beam on which the RACH procedure was initiated is located at a fixed location in the resource set of beams, and the index of the beam on which the RACH procedure was initiated is not indicated in the one or more beams. In a twenty-first aspect, alone or in combination with one or more of the first or twentieth aspects, the UCI communication includes a field that indicates an order of the one or more beams, and process 600 further comprises determining, based at least in part on the field, that the order is based at least in part on the first beam not being indicated in the one or more beams.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   initiating a random access channel (RACH) procedure using a first beam associated with a base station (BS); and
   transmitting, to the BS and during the RACH procedure, an uplink control information (UCI) communication that includes one or more index values, associated with one or more indexes associated with a resource set of beams, to indicate one or more second beams associated with the BS and included in the resource set of beams.

2. The method of claim 1, wherein the RACH procedure comprises:
   a contention-free RACH procedure;
   wherein the resource set of beams comprises:
      a combined resource set of one or more synchronization signal block (SSB)-based beams and one or more channel state information reference signal (CSIRS)-based beams; and
   wherein the one or more indexes includes at least one of:
      a first index associated with an SSB-based beam of the one or more second beams, or
      a second index associated with a CSIRS-based beam of the one or more second beams.

3. The method of claim 2, wherein one or more SSB-based beams, included in the combined resource set of one or more SSB-based beams and one or more CSIRS-based beams, are ordered before one or more CSIRS-based beams included in the combined resource set of SSB-based beams and CSIRS-based beams; or
   wherein the one or more CSIRS-based beams are ordered before the one or more SSB-based beams.

4. The method of claim 2, wherein a beam order, of the combined resource set of one or more SSB-based beams and one or more CSIRS-based beams, is based at least in part on a beam order in one or more subframes associated with the BS.

5. The method of claim 1, wherein the RACH procedure comprises:
   a contention-based RACH procedure;
   wherein the resource set of beams comprises:
      a plurality of synchronization signal block (SSB)-based beams; and
   wherein the one or more indexes includes respective indexes associated with one or more SSB-based beams of the plurality of SSB-based beams.

6. The method of claim 5, wherein the plurality of SSB-based beams comprises:
   a set of transmitted SSB-based beams indicated in a system information block (SIB) that the UE is to receive in order to initiate the RACH procedure.

7. The method of claim 1, wherein the RACH procedure comprises:
   a contention-based RACH procedure;
   wherein the resource set of beams is a first resource set of beams included in a plurality of resource sets of beams;
   wherein the first resource set of beams comprises:
      a first plurality of synchronization signal block (SSB)-based beams; and
   wherein a second resource set of beams, of the plurality of resource sets of beams, comprises:
      a second plurality of SSB-based beams.

8. The method of claim 7, wherein, if the UE and the BS are timing synchronized, the UCI communication indicates at least one index, of the one or more index, associated with the first resource set of beams to indicate the one or more second beams; or
   wherein, if the UE and the BS are not timing synchronized, the UCI communication indicates at least another index, of the one or more indexes, associated with the second resource set of beams to indicate the one or more second beams.

9. The method of claim 7, wherein the first plurality of SSB-based beams is indicated in a first system information block (SIB) or a unicast radio resource control (RRC) communication that the UE is to receive in order to initiate the RACH procedure using particular RACH resources; and
   wherein the second plurality of SSB-based beams is indicated in a second SIB that the UE is to receive in order to initiate the RACH procedure.

10. The method of claim 1, wherein the UCI communication explicitly indicates a reference signal received power (RSRP) measurement associated with a preferred beam included in the one or more second beams.

11. The method of claim 1, wherein the UCI communication implicitly indicates a reference signal received power (RSRP) measurement, associated with a preferred beam included in the one or more second beams, as a differential relative to an RSRP measurement associated with the first beam.

12. The method of claim 1, wherein the UCI communication explicitly indicates a reference signal received power (RSRP) measurement associated with the first beam.

13. The method of claim 1, wherein an index, of the one or more indexes and associated with the first beam, is located at a fixed location in the UCI communication; and
   wherein the index associated with the first beam is not indicated in the one or more second beams.

14. The method of claim 13, wherein the UCI communication includes a field that indicates an order of the one or more second beams,
   wherein the order is based at least in part on the index associated with the first beam not being indicated in the one or more second beams.

15. The method of claim 1, wherein a resource element ratio associated with a transmission of a msg3 communication in which the UCI communication is included, and a resource element ratio associated with a retransmission of the msg3 communication, are independent resource element ratios.

16. The method of claim 15, wherein a retransmission grant, for the retransmission of the msg3 communication, indicates an offset between the resource element ratio associated with the transmission of the msg3 communication and the resource element ratio associated with the retransmission of the msg3 communication.

17. The method of claim 1, wherein the UCI communication indicates respective indexes that indicates each of the one or more second beams in the resource set of beams.

18. A method of wireless communication performed by a base station (BS), comprising:
   receiving, from a user equipment (UE) and during a random access channel (RACH) procedure, an uplink control information (UCI) communication that includes one or more index values, wherein the one or more index values are associated with one or more indexes associated with one or more beams; and identifying, based at least in part on the one or more index values, the one or more beams associated with the BS and in a resource set of beams.

19. The method of claim 18, wherein the RACH procedure comprises:
a contention-free RACH procedure;
wherein the resource set of beams comprises:
a combined resource set of one or more synchronization signal block (SSB)-based beams and one or more channel state information reference signal (CSIRS)-based beams; and
wherein identifying the one or more beams in the resource set of beams comprises at least one of:
identifying, based at least in part on a first index value of the one or more index values, an SSB-based beam, of the one or more beams, in the combined resource set of one or more SSB-based beams and one or more CSIRS-based beams, or
identifying, based at least in part on a second index value of the one or more index values, a CSIRS-based beam, of the one or more beams, in the combined resource set of one or more SSB-based beams and one or more CSIRS-based beams.

20. The method of claim 19, wherein one or more SSB-based beams, included in the combined resource set of one or more SSB-based beams and one or more CSIRS-based beams, are ordered before one or more CSIRS-based beams included in the combined resource set of one or more SSB-based beams and one or more CSIRS-based beams; or
wherein the one or more CSIRS-based beams are ordered before the one or more SSB-based beams.

21. The method of claim 18, wherein the RACH procedure comprises:
a contention-based RACH procedure;
wherein the resource set of beams comprises:
a plurality of synchronization signal block (SSB)-based beams; and
wherein the one or more beams comprises:
one or more SSB-based beams of the plurality of SSB-based beams.

22. The method of claim 18, wherein the RACH procedure comprises:
a contention-based RACH procedure;
wherein the resource set of beams is a first resource set of beams included in a plurality of resource sets of beams;
wherein the first resource set of beams comprises:
a first plurality of synchronization signal block (SSB)-based beams; and
wherein a second resource set of beams, of the plurality of resource sets of beams, comprises:
a second plurality of SSB-based beams.

23. The method of claim 22, wherein identifying the one or more beams in the resource set of beams comprises:
identifying, if the UE and the BS are timing synchronized, the one or more beams in the resource set of beams based at least in part on the first resource set of beams; or
identifying, if the UE and the BS are not timing synchronized, the one or more beams in the resource set of beams based at least in part on the second resource set of beams.

24. The method of claim 22, wherein the first plurality of SSB-based beams is indicated in a first system information block (SIB) or a unicast radio resource control (RRC) communication that the UE is to receive in order to initiate the RACH procedure using particular RACH resources; and
wherein the second plurality of SSB-based beams is indicated in a second SIB that the UE is to receive in order to initiate the RACH procedure.

25. The method of claim 18, wherein the UCI communication implicitly indicates one or more reference signal received power (RSRP) measurements associated with the one or more beams; and
wherein the method further comprises:
determining the one or more RSRP measurements based at least in part on a differential, relative to an RSRP measurement associated with a beam on which the RACH procedure was initiated, indicated in the UCI communication.

26. The method of claim 18, wherein the UCI communication explicitly indicates a preferred beam of the one or more beams.

27. A user equipment (UE) for wireless communication, comprising:
a memory; and
one or more processors coupled to the memory, the one or more processors configured to:
initiate a random access channel (RACH) procedure using a first beam associated with a base station (BS); and
transmit, to the BS and during the RACH procedure, an uplink control information (UCI) communication that includes one or more index values, associated with one or more indexes associated with a resource set of beams to indicate one or more second beams associated with the BS and included in the resource set of beams.

28. The UE of claim 27, wherein the RACH procedure comprises:
a two-step RACH procedure; and
wherein the one or more processors, to transmit the UCI communication, are configured to:
transmit the UCI communication in a msgA communication;
receive, from the BS, a fallback indication based at least in part on transmitting the UCI communication in the msgA communication; and
transmit the UCI communication in a msg3 communication based at least in part on receiving the fallback indication,
wherein a resource element ratio, associated with the msgA communication, and a resource element ratio, associated with the msg3 communication, are different resource element ratios.

29. A base station (BS) for wireless communication, comprising:
a memory; and
one or more processors coupled to the memory, the one or more processors configured to:
receive, from a user equipment (UE) and during a random access channel (RACH) procedure, an uplink control information (UCI) communication that includes one or more index values, wherein the one or more index values are associated with one or more indexes associated with one or more beams; and
identify, based at least in part on the one or more index values, the one or more beams associated with the BS and in a resource set of beams.

30. The BS of claim 29, wherein the RACH procedure comprises:

a contention-free RACH procedure;
wherein the resource set of beams comprises:
- a combined resource set of synchronization signal block (SSB)-based beams and channel state information reference signal (CSIRS)-based beams; and wherein the one or more processors, to identify the one or more beams in the resource set of beams, are configured to at least one of:
- identify, based at least in part on a first index of the respective one or more indexes, an SSB-based beam, of the one or more beams, in the combined resource set of SSB-based beams and CSIRS-based beams, or
- identify, based at least in part on a second index of the one or more indexes, a CSIRS-based beam, of the one or more beams, in the combined resource set of SSB-based beams and CSIRS-based beams.

* * * * *